United States Patent
Jaques

(10) Patent No.: US 12,072,980 B2
(45) Date of Patent: Aug. 27, 2024

(54) ANTI-VIRUS DEVICE FOR INDUSTRIAL CONTROL SYSTEMS

(71) Applicant: CONOCOPHILLIPS COMPANY, Houston, TX (US)

(72) Inventor: Mark Jaques, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/386,412

(22) Filed: Apr. 17, 2019

(65) Prior Publication Data

US 2019/0318095 A1 Oct. 17, 2019

Related U.S. Application Data

(60) Provisional application No. 62/658,914, filed on Apr. 17, 2018.

(51) Int. Cl.
G06F 21/56 (2013.01)

(52) U.S. Cl.
CPC .......... *G06F 21/567* (2013.01); *G06F 21/561* (2013.01); *G06F 2221/034* (2013.01)

(58) Field of Classification Search
CPC .... G06F 21/554; G06F 21/561; G06F 21/567; G06F 2221/034
See application file for complete search history.

(56) References Cited

U.S. PATENT DOCUMENTS

| | | | | |
|---|---|---|---|---|
| 8,307,443 | B2 * | 11/2012 | Wang | G06F 21/53 713/188 |
| 8,813,214 | B1 * | 8/2014 | McNair | H04L 63/145 726/22 |
| 10,747,906 | B2 * | 8/2020 | Papillon | G06F 21/445 |
| 2008/0288782 | A1 * | 11/2008 | Iyer | G06F 21/80 713/186 |
| 2013/0247206 | A1 * | 9/2013 | Hugard, IV | G06F 21/57 726/25 |
| 2013/0247207 | A1 * | 9/2013 | Hugard, IV | G06F 21/57 726/25 |
| 2015/0052365 | A1 | 2/2015 | Young et al. | |
| 2016/0180092 | A1 * | 6/2016 | Aktas | G06F 21/44 726/23 |
| 2016/0234240 | A1 | 8/2016 | Dietrich et al. | |
| 2016/0241583 | A1 * | 8/2016 | Kowalczyk | H04L 63/20 |
| 2016/0328579 | A1 * | 11/2016 | Jois | G06F 21/85 |
| 2017/0034205 | A1 | 2/2017 | Canedo et al. | |
| 2018/0239912 | A1 * | 8/2018 | Welch | G06F 21/604 |
| 2018/0373864 | A1 * | 12/2018 | Apvrille | G06F 21/6209 |
| 2019/0220594 | A1 * | 7/2019 | Tutika | G06F 21/56 |

FOREIGN PATENT DOCUMENTS

EP 2672414 A1 12/2013

OTHER PUBLICATIONS

Pajari, George E., "USB Flash Storage Threats and Risk Mitigation in an Air-Gapped Network Environment", 2014, Cansecwest Vancouver 2014, 8 pgs.

International Search Report, PCT/US2019/027917, Mailed Jul. 2, 2019; 3 pgs.

\* cited by examiner

*Primary Examiner* — Linglan Edwards
(74) *Attorney, Agent, or Firm* — Polsinelli PC

(57) ABSTRACT

Method of detecting malware in a computer storage medium is described. The method involves connecting the computer storage medium to an air-gapped anti-malware device. Scanning the computer storage medium for malware.

18 Claims, 2 Drawing Sheets

ANTI-VIRUS DEVICE FOR INDUSTRIAL CONTROL SYSTEMS

CROSS-REFERENCE TO RELATED APPLICATIONS

This application is a non-provisional application which claims benefit under 35 USC § 119(e) to U.S. Provisional Application Ser. No. 62/658,914 filed Apr. 17, 2018, entitled "Anti-Virus Device for Industrial Control Systems," which is incorporated herein in its entirety.

STATEMENT REGARDING FEDERALLY SPONSORED RESEARCH

None.

FIELD OF THE INVENTION

This invention relates to devices and methods for on-field detection of malware using small factor form low power devices.

BACKGROUND OF THE INVENTION

Malicious software (e.g., malware) presents a serious hazard to computer systems and devices. Types of malware include, but are not limited to, computer viruses, worms, Trojan horses, rootkits, keyloggers, spyware, ransomware and the like. Once present on a computing system or device, malware can appropriate personal, financial or otherwise sensitive information, and/or hinder or wholly prevent proper system performance. Despite efforts to block or remove malware from systems (cybersecurity), it is estimated that millions of computing systems are infected with some form of malware. The widespread presence of malware is due in part to the extent and diversity of malware variants. In addition, many new malware variants are being constantly created, typically in increasing sophistication and complexity.

Cybersecurity is an important concern even in industrial and utility settings. Industrial control systems often cannot be scanned or patched due to uptime requirements or simply because legacy systems have no means of being updated. Industrial control systems (ICS) generally refer to control systems used in industrial processing and production, public utility infrastructures, and private facility management. They are common in various industries including energy (e.g., electricity plant, nuclear reactor), water, and oil and gas.

A distributed control system (DCS) is one type of industrial control system utilized to monitor and control multiple sub-systems that are each responsible for localized processing and production. In a DCS architecture, control elements might be hierarchically distributed through the system to coordinate operation of lower-level processing and production equipment. A supervisory control and data acquisition (SCADA) system is another type of industrial control system utilized to monitor and control remotely-located systems that might be distributed across wide geographic areas at multiple sites. In a SCADA architecture, a control center may collect data from the remotely-located systems and issue commands to control the equipment of these remotely-located systems.

Industrial control systems thus often include multiple interconnected components in signal communication with each other, either directly or across a network. A Process Control Network (PCN) is a communications network that is used to transmit instructions and data between control and measurement units and Supervisory Control and Data Acquisition (SCADA) equipment. The components of industrial control systems may exchange communications to report and collect data as well as to issue and receive commands. Industrial control systems may also utilize access control mechanisms to identify, authenticate, and authorize components requesting access to another component in the system. For example, based on data received from remote stations, automated or operator-driven supervisory commands can be pushed to remote station control devices, which are often referred to as field devices. Field devices control local operations, such as opening and closing valves and breakers, collecting data from sensor systems, and monitoring the local environment for alarm conditions. Malware can cause major disruptions to industrial control systems.

Malware infection of an industrial control systems can have serious economic/safety repercussions. A malware event on an industrial control system may impact a single device (e.g., a single operator human-machine interface), a system or series of devices (e.g., safety system, business planning and control system, heating, ventilation and air conditioning, etc.), a whole facility resulting in shutdown or unrevealed failure mode, a corporation (e.g., series malware infection spreads from ICS to corporate information technology).

While some facilities have robust anti-malware controls, others do not. Almost all facilities carry a high risk of malware delivery through USB media (e.g., memory stick, portable hard drive, cell phone, tablet, etc.). Most facilities use a two-step process to check USB media. Step one involves performing a virus scan using the corporate information technology (IT) systems. Step two involves performing a virus scan using the ICS anti-virus software. However, there are several issues with this approach. First, the use of full size IT PC's—desktop or laptop computers are often not desirable in the ICS environment. Moreover, the anti-virus software used is likely to be the same, rendering the second scan ineffective. Thirdly, most corporate IT systems are windows-based computers connected to the internet offering potential to infect a previously uninfected device.

SUMMARY OF THE INVENTION

This invention relates to devices and methods for on-field detection of malware using small factor form low power devices.

One example of a method for detecting malware in a computer storage medium includes: connecting the computer storage medium to an air-gapped anti-malware device; and scanning the computer storage medium for malware Another example of a method for detecting malware includes: connecting a computer storage medium to an anti-malware device, wherein the anti-malware device is air-gapped from an enterprise network; and scanning the computer storage medium for malware.

Yet another example of a method for detecting malware includes: probing a computer storage medium with an anti-malware device, wherein the anti-malware device; and scanning the computer storage medium for malware.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Figure 1:
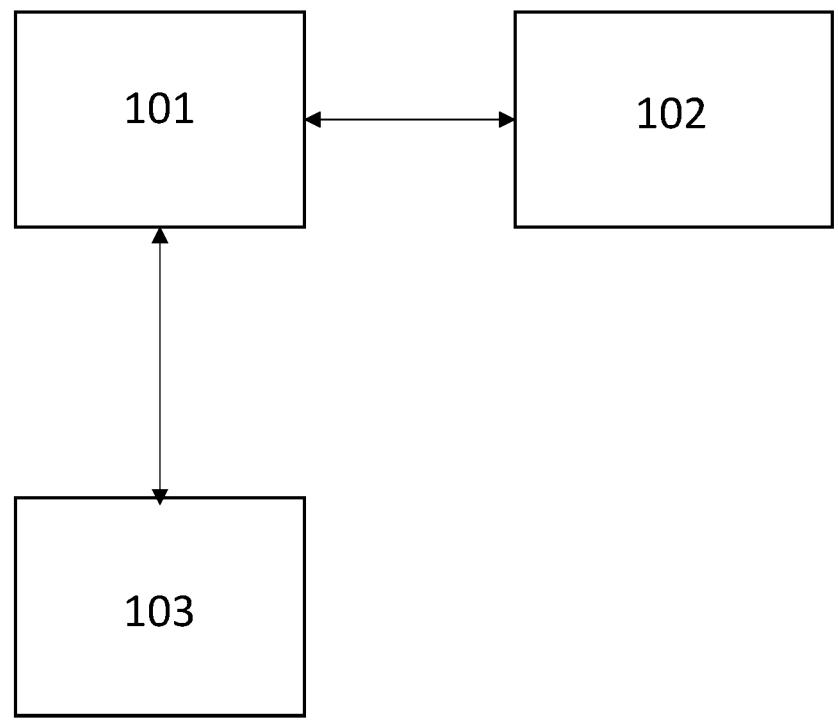
FIG. 1 is a block diagram depicting an anti-malware device according to an embodiment of the present invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Currently, most industrial facilities use a two-layered approach for protecting its ICS:
  Scanning a Universal Serial Bus (USB) medium for malware using corporate IT
  Scanning the USB medium again upon insertion into a process control network (PCN) device.

There are several problems with this approach. First, the anti-malware software is likely to be the same software on both systems—rendering the second check null. Second, the corporate IT is typically a Windows® device connected to the internet and may well be already infected and could be re-infecting the USB medium with an undetected threat.

The present invention provides devices and methods for an independent and inexpensive layer of malware protection for industrial control systems. The two-layered approach can also be used but with clear distinction(s):
  USB medium scanned for malware using an "air gapped" anti-malware device
  USB medium scanned again upon insertion into a PCN device As used herein, the term "air gap" or its related terms such as, but not limited to, "air gapped," "air wall," or "air gapping" is a network security measure employed to ensure that a secure (uninfected) computer network is physically isolated from unsecured (infected or potentially infected) networks or storage medium devices.

The air-gapped anti-malware (AGAM) device provides a protection layer that physically isolates ICS from an unsecured medium and can replace the use of corporate IT and/or conventional anti-malware solutions. According to one or more embodiments of the present invention, the air-gapped anti-malware device is relatively inexpensive (currently ~$100-$150 for parts) device that requires low power (can run off USB or 5 v power supply or battery) for normal operations. Other advantages will be apparent from the disclosure herein.

An AGAM device according to the present invention can be based on a single board computer (SBC). Single Board Computers (SBCs) can include all of the processing and memory functions of a full-sized computer on a single Printed Circuit Board (PCB). In addition to having a smaller size than traditional computers such as a laptop or desktop computer, SBCs are also typically less expensive. Examples of recent SBCs include the Raspberry Pi module, the Intel Edison module, the Intel Galileo module, and the Arduino module.

The following SBC device is described for illustrative purposes. The example is not intended to be limiting.

According to one embodiment, the AGAM device is comprised of a 7" capacitive touch screen and a single board computer (Raspberry Pi 3 Model B) with the following hardware specifications:
  1.2 GHZ Quad Core CPU
  4×USB2 Ports
  1 GB Memory
  16 GB MicroSD Storage
  HDMI (Unused)
  10/100 Ethernet (Unused)
  802.11n Wireless
  Bluetooth (Unused)

The inputs (e.g., USB ports) and data transfer protocols (e.g., ethernet, wireless, Bluetooth) may be used to update the device's software.

The principle purpose of the AGAM device is to offer an independent layer of malware protection for USB storage media through the deployment of an inexpensive hardware device. The device offers the following enhancements above and beyond the typical anti-virus provision:
  Independence from process control and corporate networks—the device can leverage guest Wi-Fi network for signature updates but is otherwise stand-alone. Even if a threat is detected, it is isolated from the corporate or facility networks.
  Dissimilar Anti-Virus Software—the installed Anti-Virus software is not in general use elsewhere and is therefore unlikely to duplicate scans performed by other windows host devices.
  Dissimilar Operating System—the Linux based operating system is far less susceptible to malware (but not impervious). With this in mind, the device can both scan attached USB mass media and can, on instruction, scan itself.
  Simple—any problems with the device operation or suspicions it has been compromised then it can be very quickly rebuilt.

The AGAM device can have any number of inputs commonly used to transfer digital data. These input interface types include, but are not limited to, USB®, Thunderbolt®, Firewire®, Secure Digital (SD) memory cards, and the like. FIG. 1 is a high-level process flow diagram that summarizes how the air-gapped anti-malware device can detect malware stored in a USB® storage medium device. For purposes of this application, the different input interfaces are interchangeable unless otherwise noted. Once the USB® storage medium device is physically connected to the AGAM device, it is initially scanned (ScanUSB.sh).

Generally, some of the teachings herein are reduced to an algorithm that is stored on machine-readable media. The algorithm is implemented by the computer processing system and provides operators with desired output.

Referring to FIG. 1, a single board computer includes processor 101, memory 102, and interface 103. Processor 101 can include circuitry such as one or more processors for executing instructions and can include a microcontroller, a Field Programmable Gate Array (FPGA), hard-wired logic, analog circuitry and/or a combination thereof.

Memory 102 can include, for example, a Dynamic Random Access Memory (DRAM) or other type of memory used to store computer-executable instructions for execution by processor 101. Memory 102 may also store data used by processor 101 in executing computer executable instructions. In one embodiment, processor 101 and memory 102 may be combined as a system on a chip (SoC).

Interface 103 allows a user to control the single board computer. Suitable interfaces may include any combination of, screen, touchscreen, keyboard, mouse, and the like.

Figure 2:
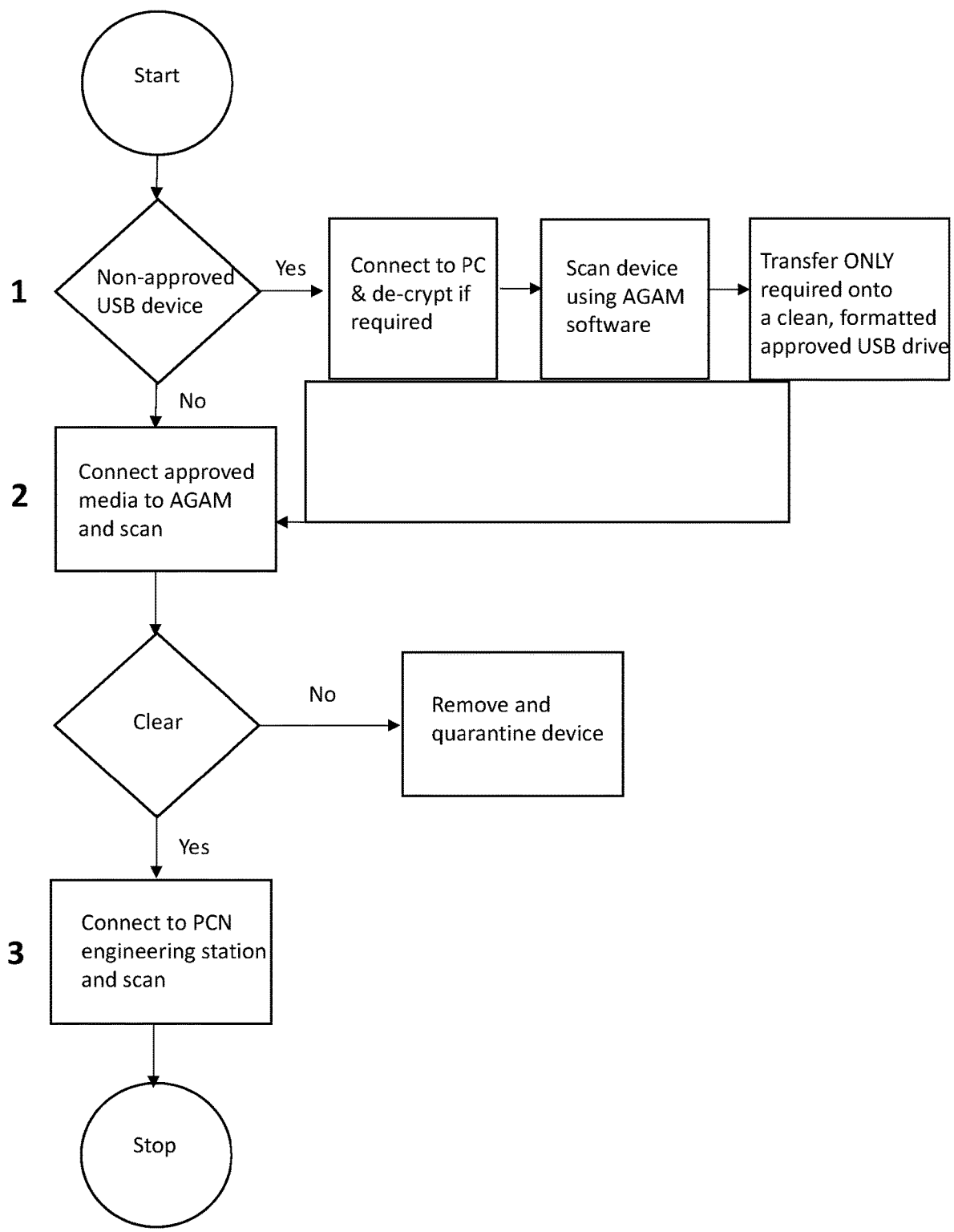
FIG. 2 is a flow chart according to an embodiment of the present invention.

FIG. 2 illustrates a three-step scanning process according to an embodiment of the present invention:

STEP 1: Decryption and File Transfer
1. Insert the untrusted USB device into an enterprise computer
   a. OPTIONAL: Install and/or launch the associated decryption software to access the required partition
   b. The device will automatically be scanned using the corporate anti-malware software
2. Insert a trusted USB device for exclusive use in on the Process Control Network
3. Format the trusted USB device
4. Transfer only the required files from the untrusted device to the formatted, trusted device using file manager
5. Return the untrusted device to the owner STEP 2: AGAM Malware Check
(Plug the PCN approved, trusted USB media into spare USB ports on the side of the device)
1. Initiate USB scan via AGAM interface
2. Update the AV signatures if you have a Wi-Fi Connection
3. Scan the USB media Scanning results will be summarized to the screen on completion. Detailed logging is available in a log file or folder.

STEP 3: PCN Malware Check
1. Connect the PCN approved, trusted USB media into an PCN workstation or similar
2. Scan the USB media using the installed AGAM software In support of the teachings herein, various analysis components may be used, including digital and/or analog systems. The digital and/or analog systems may be included, for example, in a processing device or system such as those described herein. The digital and/or analog systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The term "or" when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for malware detection, the method comprising:
   performing a decryption and file transfer procedure with a first sequence of operations including:
      connecting an untrusted device to a PC device, the PC device being an enterprise computer,
      scanning the untrusted device connected to the enterprise computer, the untrusted device being scanned using corporate anti-malware software, and
      transferring files from the untrusted device to a trusted Process Control Network (PCN) device using a file manager after the untrusted device is scanned, wherein the trusted PCN device is for exclusive use with a PCN after completion of the decryption and file transfer procedure and an air-gapped anti-malware (AGAM) malware check procedure;
   performing the AGAM malware check procedure, after the first sequence of operations, with a second sequence of operations including:
      connecting to an air-gapped anti-malware (AGAM) device to perform an AGAM malware check on the files after the files are transferred, and
      scanning the trusted PCN device using the AGAM device during the AGAM malware check, antivirus (AV) signatures being updated in association during the AGAM malware check; and
   performing a PCN malware check procedure, after the second sequence of operations, with a third sequence of operations including:
      connecting the trusted PCN device to a PCN workstation, and
      scanning the trusted PCN device using AGAM software installed on the PCN workstation during a PCN malware check, the PCN malware check following the AGAM malware check.

2. The method of claim 1, wherein the untrusted device is a Universal Serial Bus (USB) device.

3. The method of claim 1, wherein prior to scanning the untrusted device, the untrusted device is decrypted to access the files from a partition.

4. The method of claim 1, wherein the untrusted device is automatically scanned after connecting to the enterprise computer.

5. The method of claim 1, wherein the AV signatures are updated using a wireless connection.

6. The method of claim 1, wherein scanning results are summarized upon completion.

7. The method of claim 1, wherein the AGAM device includes a touchscreen interface.

8. The method of claim 1, wherein the AGAM device is a single board computer.

9. The method of claim 1, wherein the method further comprises performing, with the AGAM device, a self-scan such that the AGAM device scans itself for malware.

10. A system for malware detection, the system comprising:
an enterprise computer being a PC device and configured to perform a first sequence of operations including:
connecting an untrusted device to the enterprise computer,
scanning the untrusted device using corporate anti-malware software, and
transferring files from the untrusted device to a trusted Process Control Network (PCN) device after the untrusted device is scanned;
an air-gapped anti-malware (AGAM) device configured to perform a second sequence of operations, after the first sequence of operations, the second sequence of operations including:
connecting the AGAM device to the trusted PCN device;
scanning the trusted PCN device, using an AGAM malware check, and
updating antivirus (AV) signatures at the AGAM device via a guest Wi-Fi connection, the untrusted device being scanned using corporate anti-malware software, wherein the trusted PCN device is connected to the AGAM device to perform the AGAM malware check on the files after the files are transferred, and the trusted PCN device is for exclusive use with a PCN after the second sequence of operations; and
a PCN workstation running AGAM software configured to perform a third sequence of operations, after the second sequence of operations, the third sequence of operations including:
connecting the PCN workstation to the trusted PCN device, and
scanning the trusted PCN device with the PCN workstation, using a PCN malware check, the PCN malware check following the AGAM malware check.

11. The system of claim 10, wherein the untrusted device is a Universal Serial Bus (USB) device.

12. The system of claim 10, wherein the untrusted device is automatically scanned after connecting to the enterprise computer.

13. The system of claim 10, wherein the trusted PCN device is formatted prior to transferring the files.

14. The system of claim 10, wherein the AV signatures are updated using a wireless connection.

15. The system of claim 10, wherein scanning results are summarized upon completion.

16. The system of claim 10, wherein the AGAM device includes a touchscreen interface.

17. The system of claim 10, wherein the AGAM device is a single board computer.

18. A method for malware detection, the method comprising:
performing a first sequence of operations including:
connecting an untrusted device to a PC device, the PC device being an enterprise computer,
scanning the untrusted device connected to the enterprise computer, the untrusted device being scanned using corporate anti-malware software, and
transferring files from the untrusted device to a trusted Process Control Network (PCN) device using a file manager after the untrusted device is scanned, wherein the trusted PCN device is for exclusive use with a PCN after the first sequence of operations and a second sequence of operations;
performing the second sequence of operations, after the first sequence of operations, the second sequence of operations including:
connecting the trusted PCN device to an air-gapped anti-malware (AGAM) device to perform an AGAM malware check on the files after the files are transferred, the AGAM device having a dissimilar operating system relative to the enterprise computer, and the AGAM device having dissimilar antivirus software relative to windows devices,
scanning the trusted PCN device using the AGAM device during the AGAM malware check, and
updating antivirus (AV) signatures at the AGAM device via a Wi-Fi guest connection as part of the AGAM malware check; and
performing a third sequence of operations, after the second sequence of operations, the third sequence of operations including:
connecting the trusted PCN device to a PCN workstation,
scanning the trusted PCN device using AGAM software installed on a PCN workstation during a PCN malware check, the PCN malware check occurring after the AGAM malware check, and
providing, using the files at the PCN, an equipment operation instruction.

* * * * *